Patented Sept. 25, 1923.

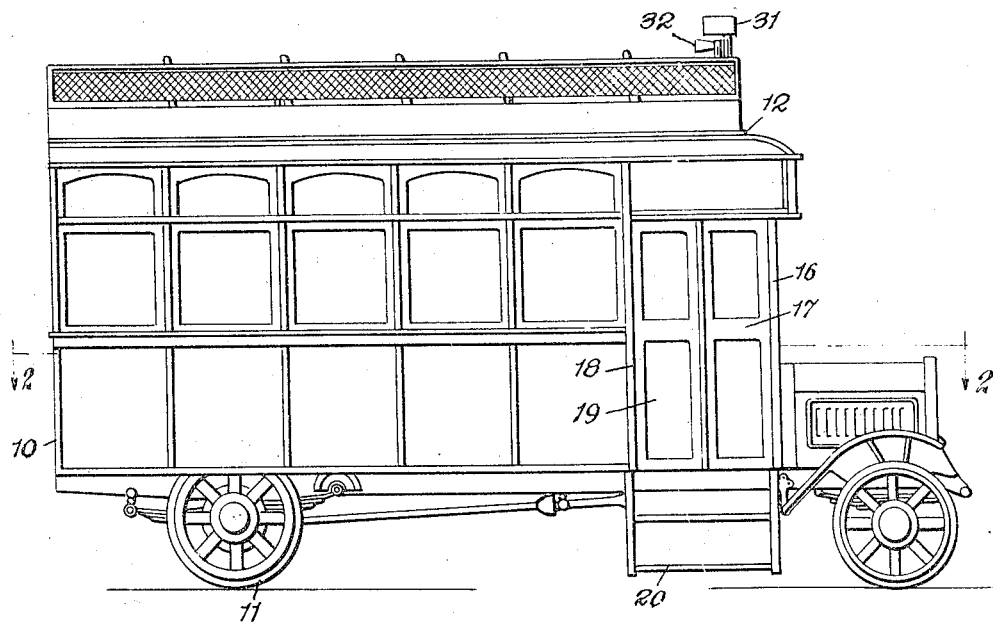

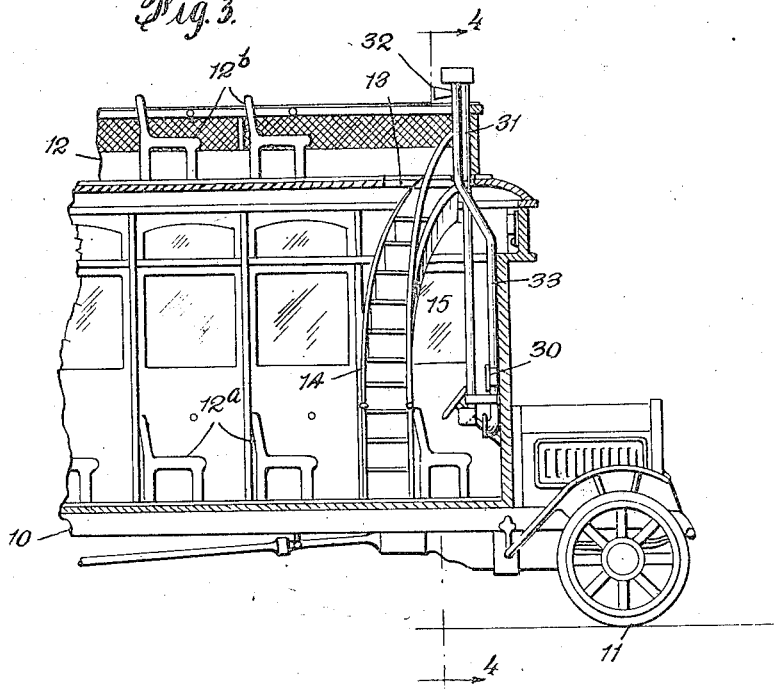
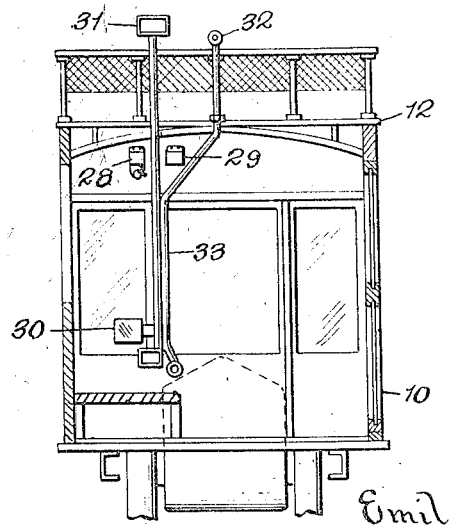

1,468,710

UNITED STATES PATENT OFFICE.

EMIL LEINDORF, OF NEW YORK, N. Y.

PASSENGER BUS.

Application filed January 25, 1922. Serial No. 531,653.

*To all whom it may concern:*

Be it known that I, EMIL LEINDORF, a citizen of the United States, and a resident of New York, in the county of New York and State of New York, have invented certain new and useful Improvements in a Passenger Bus, of which the following is a full, clear, and exact specification.

This invention relates more particularly to a class of public vehicles.

My invention has for its object primarily to provide a vehicle or bus designed to be employed especially on public highways for carrying passengers, and which is of a form adapted to permit one person to serve as a chauffeur or operator of the vehicle as well as performing the duties usually required of a conductor, in order to save the expense of the services of the latter attendant as is incident to the types of public vehicles of this class at present in use. The invention consists mainly of the provision of a vehicle body having an upper deck with an entrance, and leading from the interior of the body to this entrance is a stairway so that persons admitted into the body may pass to the deck. In the body contiguous to the stairway is a compartment for occupancy by a chauffeur or opeartor of the vehicle. In one of the walls of the body leading toward the compartment is a door closed entrance for admitting passengers into the body and to the upper deck, and adjacent to this entrance is a door closed exit for allowing passengers to depart from the deck and from the body so that the operator of the vehicle may easily observe the persons entering and leaving the vehicle.

Other objects of the invention are to provide a signalling device which is operative within the body to indicate a given signal in the compartment; to provide a second signalling device which is operative on the upper deck to indicate in the compartment a signal distinct from the other signal; and to provide a passenger bus of a simple and efficient form which may be made in any appropriate size.

With these and other objects in view, the invention will be hereinafter more fully described with reference to the accompanying drawings forming a part of this specification in which similar characters of reference indicate corresponding parts in all the views, and will then be pointed out in the claim at the end of the description.

In the drawings, Figure 1 is a side elevation of one form of passenger bus embodying my invention.

Fig. 2 is a sectional view taken on the line 2—2 of Fig. 1.

Fig. 3 is a fragmentary detail sectional view taken on the line 3—3 of Fig. 2, and Fig. 4 is a detail sectional view, partly fragmentary, taken on the line 4—4 of Fig. 3.

The bus has a body 10 mounted on wheels 11, and the vehicle is preferably of an automotive driven class. The body may be of any appropriate shape and size, though the form of the body shown is substantially rectangular and on top of the body is an upper deck 12. Interiorly of the body are a number of suitably arranged spaced seats $12^a$, while on the upper deck are also provided spaced seats $12^b$ so that passengers may be accommodated on the deck and in the body.

In the forward part of the floor of the upper deck of the body is an opening which serves as an entrance 13 leading from the interior of the body to the deck, and within the forward part of the body 10 is a stairway 14 which leads to the entrance 13 for enabling persons to pass to and from the deck from the interior of the body. In the body between its front end and the stairway 14 is a compartment 15 for occupancy by the chauffeur or operator of the vehicle. In one of the side walls of the body 10 at its front end is an entrance 16 which is adapted to be opened and closed by a door 17, and in this side wall of the body is an exit 18 adjacent to the entrance 16. The exit 18 is also adapted to be opened and closed by a door 19, and both of the doors may be of forms to permit the chauffeur of the vehicle to operate them. On the exterior of the body of the vehicle may be one or more steps, as 20, so that passengers may enter and depart from the vehicle to and from the highway when the vehicle is at a standstill. In the body 10 and leading from the entrance 16 toward the compartment 15 is a passage 21, and also in the body leading from the exit 18 toward the stairway 14 is another passage 22. The passages 21 and 22 are adjacent to each other, and they may be formed by providing a railing, as 23, which extends from between the doors 17 and 19 to part of the interior of the body 10 in spaced relation to the compartment 15. In the space between the compartment and the railing 23 may be provided a box, as 24, of any well known or preferred type into which are deposited the fares of the passengers admitted into the vehicle. Between the railing 23 and the fare box 24 may be a gate, as 25, which is hinged to the railing in a manner so that the gate may be swung to open and closed positions whereby the passengers may be admitted into the body of the vehicle back of the compartment 15, but will be prevented from leaving the body through the passage 21. The passage 22 is provided by a railing, as 26, interiorly of the body from the exit 18 so that this railing 26 is in spaced parallel relation to the railing 23. To part of one of these railings within the body 10 may be hinged a gate, as 27, adapted to be swung toward and from the door 19 so that passengers departing from the vehicle will pass from the body and from the upper deck into the passage 22 and depart through the exit 18, in order not to interfere with the passengers entering the vehicle by way of the entrance 16.

To allow passengers in the body 10 to notify the chauffeur or operator to stop the vehicle a signal, as 28, is provided in the compartment 15. This signal may be in the form of a bell which is preferably interposed in an electric circuit, not shown, which is arranged for being closed to cause the bell to ring by pressing one or more push buttons provided at suitable parts of the interior of the body. To permit passengers on the upper deck 11 to notify the chauffeur or operator to stop the bus a signal, as 29, is also provided in the compartment 15. The signal 29 may be in the form of a "buzzer" so that its sound will be distinct from the bell 28 for enabling the chauffeur to distinguish whether one or more passengers of the upper deck or one or more passengers in the body of the vehicle desire to depart. The signal or "buzzer" 29 is preferably interposed in an electric circuit, not shown, which is arranged for being closed to cause it to sound by pressing one or more push buttons suitably positioned on the upper deck of the vehicle.

In the compartment 15 may also be provided a reflector or mirror 30 disposed so that the chauffeur may observe the movements of the passengers within the body 10, and leading from the compartment 15 to the upper deck 11 of the vehicle may be a suitable type of periscope, as 31, to enable the chauffeur to observe the movements of the passengers of the upper deck. On the upper deck of the vehicle may also be mounted a megaphone, as 32, and leading to the megaphone from the compartment 15 may be a speaking tube 33 so that the chauffeur of the vehicle may give verbal instructions or announcements to the passengers on the deck. Thus I provide a simple, efficient and durable passenger bus for public use of a form adapted to be operated by one person, in order to dispense with the services of a conductor as is incident to public vehicles of this class in general use at present.

In the foregoing description, I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof

Having thus described my invention, I claim as new and desire to secure by Letters Patent:—

A passenger bus with a body having an upper deck with an exit and entrance in the front part of the bus, a stairway within the body and facing the exit, an entrance door and an exit door adapted to be operated by the chauffeur, parallel railings extending from each side of the exit door, an outwardly swinging exit gate hinged to one of the railings adjacent the exit door, an inwardly swinging entrance gate normally extending at right angles to the exit gate, a driver's seat located beneath the stairway and a coin box located approximately between the driver's seat and the entrance gate.

This specification signed and witnessed this 23rd day of January, A. D. 1922.

EMIL LEINDORF.

Witnesses:
A. H. MALLENHAUER, Jr.
A. LIECHTER.